US008030433B2

(12) United States Patent
Whiteker et al.

(10) Patent No.: US 8,030,433 B2
(45) Date of Patent: Oct. 4, 2011

(54) RTM AND RI PROCESSIBLE TAILORABLE POLYIMIDE RESIN SYSTEMS AND COMPOSITE ARTICLES FORMED THEREFROM

(75) Inventors: Stephen Mark Whiteker, Covington, KY (US); Lisa Vinciguerra Shafer, Cincinnati, OH (US); Warren Rosal Ronk, West Chester, OH (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 11/965,071

(22) Filed: Dec. 27, 2007

(65) Prior Publication Data

US 2008/0146769 A1   Jun. 19, 2008

Related U.S. Application Data

(63) Continuation-in-part of application No. 11/928,274, filed on Oct. 30, 2007, which is a continuation-in-part of application No. 11/757,683, filed on Jun. 4, 2007, which is a continuation-in-part of application No. 11/383,079, filed on May 12, 2006, which is a continuation-in-part of application No. 11/383,086, filed on May 12, 2006, now abandoned, which is a continuation-in-part of application No. 11/383,092, filed on May 12, 2006, which is a continuation-in-part of application No. 11/383,100, filed on May 12, 2006, which is a continuation-in-part of application No. 11/383,104, filed on May 12, 2006.

(51) Int. Cl.
*C08G 69/02* (2006.01)

(52) U.S. Cl. ........ 528/230; 528/170; 528/171; 528/172; 528/173; 528/174; 528/175; 528/176; 528/329.1; 525/420; 525/422

(58) Field of Classification Search .......... 528/170–176, 528/125, 128, 183, 185, 188, 230, 329.1; 525/420, 422
See application file for complete search history.

(56) References Cited

U.S. PATENT DOCUMENTS

| 5,115,087 A * | 5/1992 | Sheppard et al. | 528/322 |
| 6,184,333 B1 * | 2/2001 | Gray | 528/170 |

FOREIGN PATENT DOCUMENTS

WO  9426493 A1  11/1994

OTHER PUBLICATIONS

Prosecution Documents in related case, U.S. Appl. No. 11/965,083.
EP Search Report and Opinion dated Apr. 26, 2010.
EP Search Report and Opinion dated Apr. 21, 2009.

* cited by examiner

*Primary Examiner* — James J Seidleck
*Assistant Examiner* — Gregory Listvoyb
(74) *Attorney, Agent, or Firm* — Marcella R. Louke

(57) ABSTRACT

Tailorable polyimide resin systems suitable for processing by resin transfer molding (RTM) and resin infusion (RI) methods. An exemplary resin system includes first and second prepolymer components present in respective amounts to provide the desired processability. The cured polyimide system exhibits high glass transition temperature and other properties required for gas turbine engine applications. The first and second prepolymer components independently comprise a monomeric mixture or a reaction product of a diamine component, a dianhydride component, and an end group component.

7 Claims, No Drawings

RTM AND RI PROCESSIBLE TAILORABLE POLYIMIDE RESIN SYSTEMS AND COMPOSITE ARTICLES FORMED THEREFROM

CROSS-REFERENCE TO RELATED APPLICATIONS

This application is a Continuation-in-Part of application Ser. No. 11/928,274 filed Oct. 30, 2007, which is a Continuation in Part of application Ser. No. 11/757,683 filed Jun. 4, 2007, which is a Continuation-in-Part of application Ser. Nos. 11/383,079, filed May 12, 2006; 11/383,086, filed May 12, 2006 now abandoned; 11/383,092, filed May 12, 2006; 11/383,100, filed May 12, 2006; 11/383,104, filed May 12, 2006; all of which are incorporated herein by reference in their entirety.

BACKGROUND OF THE INVENTION

This invention relates generally to resin transfer molding (RTM) and resin infusion (RI) methods applicable to polyimide resin systems, resin systems processible using RTM and RI methods, and to reinforced composite articles obtained therefrom.

Fiber-reinforced composite materials, which are made up of reinforcing fibers and matrix resins, are lightweight and may exhibit excellent mechanical properties. As such, these composite materials have been widely used in a variety of structural and non-structural applications in the aerospace industry.

Various methods or techniques, such as prepreg, hand lay-up, filament winding, pull-trusion, RTM and RI, have been used to produce reinforced composite materials. In the RTM method, a preform structure made up of reinforcing material is placed in a mold, a resin poured therein to impregnate the preform, and the impregnated preform structure cured to produce a molded product. The RTM method offers the advantage that a large component having a complicated shape can be molded in a short period of time.

The preform structure may include a tackifier which, when heated, will fuse onto the surface of the reinforcing material and then solidify upon cooling. Layers of the reinforcing materials with the tackifier can be stacked together, the tackifier heated, fusing the plies together under an appropriate pressure, and then cooled to form the net-shaped preform structure. The multilayered preform structure is placed into a mold, the matrix resin added, and the composite formed using usual resin transfer molding processes. U.S. Pat. No. 5,766,534 discloses a process for preparing a matrix resin composite utilizing a preform comprising two or more layers of reinforcing material and a tackifier of a curable resin applied to at least one layer of a reinforcing material. The layered assembly is compressed while the tackifier is at least partially crosslinked. Thereafter, the preform is contacted with the matrix resin, which may be the same or different from the tackifier resin. The matrix resin and tackifier are finally cured to form the matrix resin composite.

As disclosed in U.S. Pat. No. 7,129,318, the use of composite materials having polyimide resin matrices is increasing because of their lightweight and load-bearing characteristics and their oxidative stability at elevated temperatures. However, polyimide resin systems present challenges for use with RTM and RI techniques. Fiber-reinforced composite materials that use polyimide resins as the matrix resin are generally prepared using prepreg methods. For example, poly(amid) acid solutions may be processed into prepreg with various reinforcing fibers. The poly(amide) acid solutions have low solids content and high viscosity, presenting processing problems. This material is then hand-laid into composites in a labor-intensive operation.

Polyimide resin systems for use in RTM processes generally use preimidized polyimides with molecular weights ranging from 800 to 1100 g/mol. The preimidized powder may be melted and injected into a dry fiber preform. However, current RTM polyimide parts suffer from microcracking, poor thermal stability, or offer only limited temperature capability. The low viscosity/low molecular weight needed for injection often does not create favorable end properties. There currently does not exit a tackifier system suitable for use with polyimides.

Accordingly, it would be desirable to provide an RTM and RI methods that utilize the benefits of a tackifier, suitable for polyimide resin systems that provide reinforced composite structures that exhibit good mechanical an thermal properties.

BRIEF DESCRIPTION OF THE INVENTION

The above-mentioned need or needs may be met by exemplary embodiments which provide a tailorable polyimide resin system comprising a first prepolymer component and a second prepolymer component wherein the first and second prepolymer components are present in a prepolymer blend in relative amounts to enable the resin system to be processed by resin transfer molding (RTM) and resin infusion (RI) methods. The first prepolymer component comprises at least one of a monomeric mixture or a reaction product of an end group component, a dianhydride component, and a diamine component. The second prepolymer component is different from the first prepolymer component, and comprises at least one of a monomeric mixture and a reaction product of an end group component, a dianhydride component, and a diamine component.

An exemplary embodiment provides a polyimide composite article comprising reinforcing material embedded in a polyimide resin matrix prepared using resin transfer molding (RTM) or resin infusion (RI) methods. The polyimide resin matrix is a reaction product of a first prepolymer component and a second prepolymer component different from the first prepolymer component. The first prepolymer component comprises at least one of a monomeric mixture or a reaction product of an end group component, a dianhydride component, and a diamine component. The second prepolymer component comprises at least one of a monomeric mixture and a reaction product of an end group component, a dianhydride component, and a diamine component. The first and second prepolymer components are present in a prepolymer blend in relative amounts to enable the resin system to be processed by resin transfer molding (RTM) and resin infusion (RI) methods; wherein the polyimide resin matrix has a glass transition temperature of at least about 450° F. (232° C.).

DETAILED DESCRIPTION OF THE INVENTION

Embodiments disclosed herein provide polyimide systems that simultaneously offer low toxicity, a high glass transition temperature, excellent thermal oxidative stability, and the ability to be processed using RTM and RI methods. Furthermore, embodiments disclosed herein provide tailorable polyimide systems wherein relative amounts of starting materials may be altered to achieve desired outcomes.

In an exemplary embodiment, a polyimide matrix of a reinforced composite article is the reaction product of a mixture of monomeric reactants, polyimide-precursor reaction products, oligomers, and mixtures thereof. Exemplary embodiments include composite articles formed by RTM or RI methods.

Exemplary embodiments include a pre-polymer polyimide resin system that includes a first prepolymer component and a second prepolymer component. The first prepolymer component may be a mixture of monomers, a mixture of oligomers, or a pre-imidized component. The second prepolymer component may be a mixture of monomers, a mixture of oligomers, or a pre-imidized component. The first and second prepolymer components are capable of reacting to provide the cured polyimide matrix for a composite article.

An exemplary first prepolymer component includes a first monomeric mixture, or repeat units from monomers including at least one end-capping agent, at least one aromatic dianhydride or derivative thereof (e.g., the ester product formed from the dianhydride and alcoholic solvent), and at least one diamine. The second prepolymer component includes a second monomeric mixture, or repeat units from monomers including at least one end-capping agent, at least one aromatic dianhydride, and at least one diamine. The at least one aromatic dianhydride or the at least one diamine in the first prepolymer component is different from the at least one aromatic dianhydride or the at least one diamine in the second prepolymer component. The selection of the end-capping agent(s), aromatic dianhydrides, diamines, and their relative molar ratios, are considered with respect to the desired property outcomes such as molecular weight, processibility, high temperature performance, and the like.

End-group components may include structures that are capable of forming oligomer compounds and capable of crosslinking in an addition polymerization reaction to form a crosslinked polyimide structure. Crosslinkable-group-containing end blocking agents of various kinds are usable depending on the synthesis process of the polyimide, including monoamines and dicarboxylic acid anhydrides as representative examples. A variety of crosslinkable groups may be selected in accordance with molding or forming conditions.

The crosslinkable group structures contained in the end groups may include ethynyl groups, benzocyclobuten-4'-yl groups, vinyl groups, allyl groups, cyano groups, isocyanate groups, nitrilo groups, amino groups, isopropenyl groups, vinylene groups, vinylidene groups, and ethynylidene groups.

The above described, crosslinkable-group-containing end blocking agents can be used either singly or in combination. Some or all of the hydrogen atoms on one or more of the aromatic rings of the end group containing material may be replaced by a like number of substituent groups selected from halogen groups, alkyl groups, alkoxy groups, and combinations thereof.

Exemplary end group components may include, but are not limited to, the following end group structures:
nadic end groups, including, but not limited to the following formula:

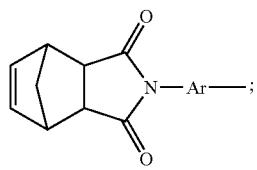

vinyl end groups including, but not limited to the following formula:

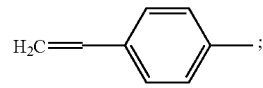

acetylene end groups including, but not limited to the following formula:

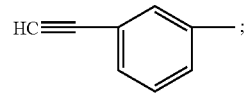

phenylethynyl end groups including, but not limited to the following formula:

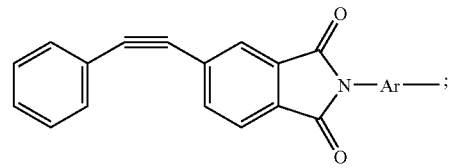

and mixtures thereof.

Ar as shown above in the nadic and phenylenthynyl end group structures may include aromatic groups, such as substituted or unsubstituted aromatic monocyclic or polycyclic linking structures. Substitutions in the linking structures may include, but are not limited to ethers, epoxides, amides, esters and combinations thereof.

The dianhydride component may include, but is not limited to, monomers having an anhydride structure, wherein an exemplary structure includes a tetracarboxylic acid dianhydride structure. The dianhydride component employed may be any dianhydride, or derivative thereof, suitable for forming crosslinkable or crosslinked polyimide prepolymer, polymer or copolymer. For example, tetracarboxylic acid dianhydrides, singly or in combination, may be utilized, as desired.

Illustrative examples of aromatic dianhydrides suitable for use include: 2,2-bis(4-(3,4-dicarboxyphenoxy)phenyl)propane dianhydride; 4,4'-bis(3,4-dicarboxyphenoxy) diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis (3,4-dicarboxyphenoxy) diphenylsulfone dianhydride; 2,2-bis(4-(2,3-dicarboxyphenoxy) phenyl)propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis (2,3-dicarboxyphenoxy)benzophenone dianhydride; 4,4'-bis (2,3-dicarboxyphenoxy) diphenyl sulfone dianhydride; 4-(2, 3-dicarboxyphenoxy)-4'-(3,4-dicarboxyphenoxy) diphenyl-2,2-propane dianhydride; 4-(2,3-dicarboxyphenoxy) -4'-(3, 4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, 1,2,4,5-benzenetatracarboxylic dianhydride as well as mixtures comprising one of the foregoing dianhydrides.

Exemplary dianhydride components include the following dianhydride compounds:

3,4,3',4'-biphenyltetracarboxylic dianhydrides (BPDA) having the following formula:

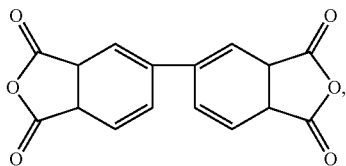

3,4,3',4'-benzophenonetetracarboxylic dianhydrides (BTDA) having the following formula:

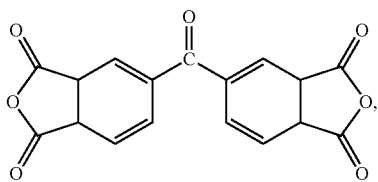

2,2-bis(3',4'-dicarboxyphenyl) hexafluoropropane dianhydrides having the following formula:

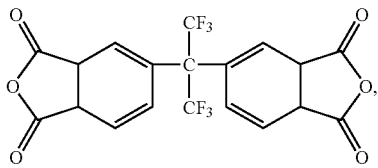

pyromellitic dianhydrides having the following formula:

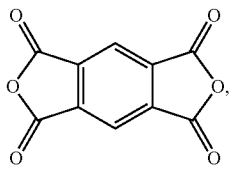

and mixtures thereof

Depending on the fabrication process, tetracarboxylic acid monoanhydrides, tetracarboxylic compounds other than anhydrides, or their derivatives such as salts may also be used as desired instead of the above-recited dianhydrides. The dianhydride components, as described above, may be used either singly or in combination as needed.

The aromatic dianhydrides can be prepared by any suitable fabricating method known in the art. One suitable fabrication method for fabricating aromatic dianhydrides may include hydrolysis, followed by dehydration, of the reaction product of a nitro substituted phenyl dinitrile with a metal salt of dihydric phenol compound in the presence of a dipolar, aprotic solvent.

The diamine component may include, but is not limited to, an aromatic diamine monomer having the following formula:

Ar as used in this formula preferably includes aromatic compounds, including substituted aromatic compounds and compounds having multiple aromatic rings. Substituent groups for substitution in the Ar group may include any suitable functional group, including, but not limited to halogen groups, alkyl groups, alkoxy groups, and combination thereof.

Examples of suitable diamine components may include, but are not limited to: 1,3-bis(aminophenoxy)benzene, 1,4-bis(aminophenoxy)benzene, 1,4-phenylenediamine ("para-PDA" or "pPDA"), 1,3-phenylene diamine ("meta-PDA" or "mPDA"), 4,4'-[1,3-phenylene bis (1-methyl-ethylidene)] bisaniline ("Bis aniline M" or "Bis-M"), ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,1 8-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3"-dimethylbenzidine, 3,3"dimethoxybenzidine, 1,5-diaminonaphthalene, bis(4-aminophenyl) methane, bis(2-chloro-4-amino-3, 5-diethylphenyl) methane, bis(4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) sulfide, bis (4-aminophenyl) sulfone, bis(4-aminophenyl) ether, 1,3-bis(3-aminopropyl) tetramethyldisiloxane and mixtures comprising at least one of the foregoing organic diamines.

Further, these diamines are also usable in place of some or all of the hydrogen atoms on one or more of the aromatic ring(s) of each of the diamines. A like number of ethynyl groups, benzocyclobuten-4'-yl groups, vinyl groups, allyl groups, cyano groups, isocyanate groups, nitrilo groups and/or isopropenyl groups, which can act as crosslinking points, may also be introduced as substituent groups on the aromatic rings, preferably to an extent not impairing the moldability or formability.

Glass transition temperature (Tg) is a measure of the ability of the polymer to maintain properties at elevated temperatures. Because bulk motion of the polymer is restricted below the Tg, the higher the Tg a material displays, typically, the higher the temperature capability of that material. Therefore, Tg of the crosslinked polyimide matrix may be a driving consideration in the make up of the prepolymer blend.

Melt viscosity is a measure of a fluids resistance to flow at temperatures above the melt point. For processing composites, it is generally desirable to have melt viscosities below 100,000 centipoise (cps) with the preferred range or 40,000 cps-800 cps wherein the melt viscosity is dependent upon the processing utilized. If the melt viscosity is not sufficiently low, processing requires excessive pressures in order to make the resin flow. Lower melt viscosities generally lead to greater processing options due to decreased pressure needs. Thus, a desired melt viscosity of the prepolymer blend may influence the respective amounts of the components in the prepolymer blend.

Thermal Oxidative Stability (TOS) is the ability of the polymer to withstand elevated temperatures in an oxygen-containing environment, such as air, with minimal loss of weight and/or properties. Turbine engine components often operate in high pressure as well as high temperature environments and the high pressure acts to increase the concentration of oxygen accelerating the deterioration of composite properties. Since, in a composite, compression strength is a resin-dominated property, the retention of compression strength after long-time exposures to high temperatures is monitored as a measure of TOS. Weight loss over time is also used as a measure. Polymers degrade through mechanisms, such as volatilization, resulting in a composite having reduced mass due to this loss of polymer. One test used herein to measure TOS includes placing a plaque of polymeric or composite material in a chamber, increasing the temperature and pressure within the chamber to a predetermined temperature and pressure, and holding these conditions for up to 150 hrs with multiple atmospheric changes over the course of the test. The plaques are then removed and tested for weight loss and retention of compression strength. The weight loss and retention of compression strength reflect service conditions in a turbine engine and provide a measure of the longer-term stability of the polymer material. A higher TOS is important for material that will be placed in a high temperature environment for long periods of time. The crosslinked polyimide copolymer preferably has a TOS of less than about 2.0% weight loss.

One embodiment includes utilizing the prepolymer blends in a resin infusion (RI) process. In RI, a fiber containing preform is typically placed on a mold or other surface capable of providing the cured material with the desired geometry. A preferred fiber, particularly for aerospace applications, is carbon fiber. The fiber reinforcement of the preform is not limited to carbon fiber and may include any suitable fiber having high strength, sufficient stiffness, and relatively low density. The fiber for impregnation may be a fiber in any suitable form including, but not limited to uniaxial, braided, multi-layered, or woven forms. In addition, the fibers may be continuous fibers, chopped fiber, braided fiber, fiber fabric, woven fibers and noncrimp fabric, unitape fiber, fiber film or any suitable form of fiber that results in a reinforced composite material when cured. In addition, multiple types of fibers may be utilized in the preform.

An exemplary prepolymer blend may be placed as a film layer or layers on or within intermediate layers of the reinforcing fiber preform to cover all or a majority of the preform. Alternatively, a film material, including the prepolymer blend, may be provided as at least a portion of the preform, wherein the material provided includes fibers onto which the resin blend has been placed into contact. The prepolymer blend resin material may be applied onto the entire surface of the reinforcing fiber preform. Alternatively, the matrix material may be interleaved between layers of the preform to cover all the layers of reinforcing fiber preform. Sufficient prepolymer material is provided to impregnate the preform during a heated resin infusion phase. Typically, the RI method will include placing a barrier layer, such as a polytetrafluoroethylene barrier onto the prepolymer blend and/or prepreg material to assist in controlling the flow of resin. The perform and prepolymer blend may then be placed into a vacuum membrane or similar vacuum providing apparatus. The mold, fiber, resin, barrier layer and vacuum membrane may be placed into an autoclave or other controlled atmosphere device. The precise processing parameters utilized can vary and may depend upon the particular materials used as the first and second prepolymer components in the prepolymer blend.

In one embodiment, the temperature and pressure are increased within the autoclave, while simultaneously drawing a vacuum on the vacuum membrane. The increased temperature and vacuum facilitate the infiltration of the resin into the preform. The temperature and vacuum are maintained until the resin has sufficiently impregnated the preform to avoid the formation of voids. After infiltration, the temperature may be increased to begin crosslinking of the prepolymer blend. The specific parameters of the cure cycle vary and depend upon the particular materials used as the first and second prepolymer components in the prepolymer blend.

In another embodiment, the polyimide prepolymer blend may be processed using resin transfer molding (RTM). The materials utilized for the fiber reinforcement and the matrix are substantially the same as those used in the discussion of the RI process above. However, in RTM, an injection system is utilized to inject the prepolymer mixture into a mold by pressurization of the prepolymer mixture. The mold, which has the substantial geometry of the finished component, includes the fiber preform. The pressurized prepolymer blend impregnates the dry fibers of the fiber preform and is cured to crosslink the prepolymer mixture and form the final component. The specific parameters of the cure cycle vary and depend upon the particular materials used as the first and second prepolymer components in the prepolymer blend.

In some cases, the desired prepolymer blend (i.e., a blend that will provide desired qualities in a composite article) may not be amenable to conventional RTM or RI processing methods. Exemplary embodiments disclosed herein provide methods for obtaining the desired composite article properties, while utilizing RTM or RI techniques.

In an exemplary embodiment, the desired prepolymer blend includes first and second prepolymer components, which when suitably combined and cured will provide the desired composite article. For example, embodiments disclosed herein provide for use of one of the first or second prepolymer component as a tackifier for an RI or RTM method. For example, the preform structure may be impregnated with a suitable amount of, for example, the first prepolymer component. The first prepolymer component may have a greater molecular weight than desired for conventional RI or RTM processing and thus, standing alone, may not be suitable for use with RI or RTM techniques. However, the first prepolymer component may impart desired qualities to the fully cured polyimide composite article. In order to incorporate the desired qualities into the composite article, while employing RTM or RI techniques, the first prepolymer component is utilized as a tackifier for the preform structure. The first prepolymer component may be a mixture of monomers, a blend of oligomers, or a pre-imidized reaction product.

The preform structure, tackified with the first prepolymer component, is then infused with a suitable amount of the second prepolymer component as in conventional RTM or RI processes. The first and second prepolymer components mix during processing and react under suitable reaction conditions to provide a polyimide composite article including a crosslinked polyimide matrix supported by the preform. In this example, the polyimide composite article may exhibit enhanced properties (i.e., Tg, void content, thermal oxidative stability, tensile strength) due to the incorporation of the first prepolymer component. Of course, other combinations of prepolymer components may be utilized following the principles taught herein. For example, the second prepolymer component could be used as the tackifier, and the first prepolymer component infused into the preform structure. In other exemplary embodiments, the first and second prepolymer components may themselves be blends or mixtures of pre-polyimide components.

In an exemplary embodiment, a prepolymer blend includes a first prepolymer component comprising at least a first polyimide oligomer having the formula $E_1$-$[R_1]_n$-$E_1$; and a second prepolymer component selected from the group consisting of $M_1$, a second polyimide oligomer having the formula $E_2$-$[R_2]_n$-$E_2$, and combinations thereof; wherein $R_1$ and $R_2$ independently comprise the following structure:

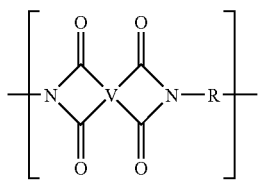

wherein n comprises from about 1 to about 5, wherein V is a tetravalent substituted or unsubstituted aromatic monocyclic or polycyclic linking structure, R is a substituted or unsubstituted divalent organic radical, $E_1$ and $E_2$ independently comprise crosslinkable functional groups, and wherein $M_1$ comprises a mixture of monomeric compounds including a diamine component comprising at least one diamine compound, a dianhydride component comprising at least one dianhydride compound, and an end group component comprising at least one end group compound.

Exemplary properties of the prepolymer blend, or the crosslinked polyimide matrix that may be varied include imidization temperature, maximum cure temperature, molecular weight distribution, tack, drape, ability to process using film infusion, ability to process using RTM, ability to modify the prepolymer blend with fillers or other agents, tensile strength, compression strength, inplane shear, and wet properties.

In other embodiments, prepolymer blends may include a plurality of preimidized reaction products. The preimidized reaction products may be blended in various ratios to optimize desired outcomes.

Using the processes described above, prepolymer blends can be readily tailored to provide desired property outcomes in the blends and the crosslinked matrices.

EXAMPLE

A prepolymer mixture was formed from a blend of dimethyl ester of 3,3',4,4'-benzophenone tetracarboxylic dianhydride ("BTDA"), (4,4'-[1,3-phenylene bis (1-methyl-ethylidene)] bisaniline) ("Bis Aniline M"), paraphenylene diamine ("para PDA"), norbornene 2,3-dicarboxylic acid ("NE") and 3,3',4,4'-biphenyl-tetracarboxylic dianhydride (BPDA). The above blend was further mixed with a solid powder second prepolymer component having a reaction product of NE, BTDA, metaphenylene diamine (meta PDA), and Bis-Aniline M.

The liquid prepolymer component included the following molar compositional concentrations of monomers:
30 mol % Bis Aniline M,
12.9 mol % p PDA,
28.6 mol % NE and
varying mol % of BPDA and BTDA, as shown in TABLE 1, wherein the total mol % of the combination of BPDA and BTDA is 28.5 mol %.

TABLE 1

MOLAR COMPOSITIONS OF EXAMPLES 1-12

| Example | BTDA | BPDA | Bis Aniline M | p PDA | NE |
|---|---|---|---|---|---|
| 1 | 24.2% | 4.3% | 30.0% | 12.9% | 28.6% |
| 2 | 24.2% | 4.3% | 30.0% | 12.9% | 28.6% |
| 3 | 24.2% | 4.3% | 30.0% | 12.9% | 28.6% |
| 4 | 21.4% | 7.1% | 30.0% | 12.9% | 28.6% |
| 5 | 21.4% | 7.1% | 30.0% | 12.9% | 28.6% |
| 6 | 21.4% | 7.1% | 30.0% | 12.9% | 28.6% |
| 7 | 24.2% | 4.3% | 30.0% | 12.9% | 28.6% |
| 8 | 24.2% | 4.3% | 30.0% | 12.9% | 28.6% |
| 9 | 24.2% | 4.3% | 30.0% | 12.9% | 28.6% |
| 10 | 21.4% | 7.1% | 30.0% | 12.9% | 28.6% |
| 11 | 21.4% | 7.1% | 30.0% | 12.9% | 28.6% |
| 12 | 21.4% | 7.1% | 30.0% | 12.9% | 28.6% |

A solid powder prepolymer component was added to the liquid monomer mixture in Examples 1-12. The solid powder prepolymer component included a reaction product of the following components:
40 mol % NE,
20 mol % BTDA,
28 mol % 1,3-phenylene diamine (meta PDA), and
12 mol % bis-aniline M.

The reaction product forming the solid powder prepolymer component was a polyimide oligomer known in the art and is commercially available as a powder. One commercially available prepolymer corresponding to the above polyimide oligomer is MM 9.36 available from Maverick Corporation, Blue Ash, Ohio.

As shown in Table 2, the solid powder prepolymer was blended with the liquid monomer prepolymer to form a mixture that has the Molecular Weight ("MW") and the structural unit size ("n") shown in the Examples. Examples 1-6 included a MW of 2100 g/mol and a structural unit size of 3. Examples 7-12 included a MW of 1600 g/mol and a structural unit size of 2. The ratio between BTDA and BPDA was varied as shown in Table 1 and the amount of powder added was varied, as shown in TABLE 2.

The mixture was cured at a temperature of about 600° F. (316° C.) and a pressure of 200 psi for 4 hours. The glass transition temperature ("Tg") for the cured Examples are shown in TABLE 3. The cured sample was then subjected to a one of 2 post cures. The first post cure includes exposing the sample to a temperature of about 600° F. (316° F.) at ambient pressure for 12 hours. The Tg values for the first post cured Examples are shown in TABLE 3. The second post cure includes exposing the sample to a temperature of about 625° F. (329° C.) at ambient pressure for 12 hrs. The Tg values for the second post cured Examples are shown in TABLE 3.

In addition to the post curing, the samples were also measured for thermal oxidative stability (TOS). The TOS for Examples 1-12 are shown in TABLE 4. Likewise, the compression strength of the samples was measured after subjecting the samples to thermal cycling from room temperature to 550° F. (288° C.) for 380 cycles. The compression data is shown in TABLE 4.

As shown in Examples 1, 4, 7 and 10, a lower Tg and a higher TOS weight loss result from the presence of the liquid monomer mixture alone. The mixture of the liquid prepolymer component with the solid prepolymer component resulted in a Tg of greater than about 500° F. (260° C.) in the cured state and a thermal oxidative stability having a TOS weight loss of less than 2.0%. In the post cured state, the Tg of Examples reached 600° F. (316° C.) or greater.

TABLE 2

TAILORABLE POLYIMIDE RESINS NADIC END CAP

| Example | Liquid Formulated MW (g/mol) | n = | Monomer Substitution in Liquid Prepolymer Component** | Powder Prepolymer Component Addition |
|---|---|---|---|---|
| 1 | 2100 | 3 | 15% | 0% |
| 2 | 2100 | 3 | 15% | 15% |
| 3 | 2100 | 3 | 15% | 30% |
| 4 | 2100 | 3 | 25% | 0% |
| 5 | 2100 | 3 | 25% | 15% |
| 6 | 2100 | 3 | 25% | 30% |
| 7 | 1600 | 2 | 15% | 0% |
| 8 | 1600 | 2 | 15% | 15% |
| 9 | 1600 | 2 | 15% | 30% |
| 10 | 1600 | 2 | 25% | 0% |
| 11 | 1600 | 2 | 25% | 15% |
| 12 | 1600 | 2 | 25% | 30% |

**percent of BTDA substituted by BPDA in liquid formulated MM 9.36 powder resin
Resin MW = 936

TABLE 3

GLASS TRANSITION TEMPERATURE

| Example | As Cured Tg (°F.) | Post Cure 1 Tg (°F.) | Post Cure 2 Tg (°F.) |
|---|---|---|---|
| 1 | 478 | 530 | 551 |
| 2 | 501 | 551 | 589 |
| 3 | 530 | 576 | 595 |
| 4 | 488 | 531 | 553 |
| 5 | 500 | 556 | 583 |
| 6 | 532 | 579 | 606 |
| 7 | 514 | 552 | 563 |
| 8 | 520 | 561 | 590 |
| 9 | 545 | 580 | 606 |
| 10 | 501 | 552 | 578 |
| 11 | 516 | 572 | 590 |
| 12 | 532 | 584 | 609 |

TABLE 4

| Example | THERMAL OXIDATIVE STABILITY TOS Weight Loss (%) | COMPRESSION STRENGTH Compression (ksi) |
|---|---|---|
| 1 | 4.83 | 56.95 |
| 2 | 1.42 | 89.75 |
| 3 | 1.62 | 78.94 |
| 4 | 2.23 | 78.87 |
| 5 | 1.39 | 85.16 |
| 6 | 1.84 | 75.67 |
| 7 | 2.8 | 90.57 |
| 8 | 1.54 | 94.09 |
| 9 | 1.91 | 92.9 |
| 10 | 1.25 | 97.76 |
| 11 | 1.44 | 98.19 |
| 12 | 1.67 | 91.61 |

An optimized resin blend may include, in terms of molar ratio, about 2 (end group component):1.35 BTDA:0.35 BPDA:1.26 phenylene diamine (mPDA and pPDA):1.44 BisM. In an exemplary embodiment, the molar ratio may be 2 NE:1.35 BTDA:0.35 BPDA:0.42 mPDA:0.84 pPDA:1.44 BisM. It is envisioned that other end capping groups may be successfully utilized in this and other exemplary formulations.

In an exemplary embodiment, some or all of the Bis M may be substituted by bis amino phenoxy benzene (APB). The Bis M may be substituted 1 for 1, maintaining the remaining molar ratios. In an exemplary embodiment, it may be desirable to increase the molar ratio of a phenylene diamine (mPDA, pPDA, or both) upon substitution of APB for Bis M. An exemplary molar ratio formulation includes about 2 NE: about 1.35 BTDA: about 0.35 BPDA: about 1.26 total (mPDA and pPDA): about 1.44 (Bis-M, APB or APB and Bis-M). In an exemplary embodiment, with a substitution of at least some of the Bis M with APB, an exemplary molar ratio formulation includes about 2 NE:about 1.35 BTDA:about 0.35 BPDA:about 1.2 total (mPDA and pPDA):about 1.5 (APB or APB and Bis M). An exemplary molar ratio includes about 2 NE:about 1.35 BTDA:about 0.35 BPDA:about 1.7 total (mPDA and pPDA):about 1.0 (APB or APB and Bis M).

The molar ratio of total phenylene diamine (mPDA and pPDA) to APB may be in the range of from about 1.2:1.5 to about 1.7:1.0. An increase in the molar ratio of total phenyl diamine to APB may be utilized to maintain the Tg of the cured polyimide matrix with respect to a comparable polyimide matrix formed from a prepolymer blend without APB substitution.

In an exemplary embodiment a tailorable polyimide prepolymer blend includes the end group component (e.g., NE), the dianhydride component (e.g., BTDA and BPDA) and the diamine component (e.g., mPDA, pPDA, and APB or APB and Bis-M). Within the diamine component, the molar ratio of total (mPDA and pPDA) to (APB or APB and Bis-M) is in the range of about 1.2-1.7 (mPDA and pPDA): about 1.0-1.5 (APB or APB and Bis-M).

In other exemplary embodiments, the molar ratio of the end group component and/or the dianhydride component may also be varied to provide the desired tailorable properties of the prepolymer blend, the cure polyimide matrix, or both.

In an exemplary embodiment, a tailorable prepolymer blend has a molecular weight of between about 1,100 to about 2,100 g/mol. In an exemplary embodiment, a tailorable prepolymer blend has a molecular weight of between about 1,200 to about 1,600 g/mol.

Exemplary prepolymer components for use in RTM processes preferably have molecular weights of less than about 1000 g/mol. However, the desired high temperature properties may not be attained from such prepolymer components alone. To obtain the desired properties in the cured composite structure, the lower molecular weight component is mixed with another, higher molecular weight component.

In an exemplary embodiment, a preform structure is impregnated with the higher molecular weight component. During the RTM process, the lower molecular weight component contacts and mixes with the higher molecular weight component to form a suitable resin system. When cure, the composite article exhibits properties attained by utilizing the higher molecular weight component.

In an exemplary embodiment, the end cap component, the dianhydride component, and the diamine component are present in respective amounts such that, prior to cure, the prepolymer blend provides at least one predetermined prepolymer blend property, and when cured under suitable cure conditions, the prepolymer blend provides a crosslinked polyimide matrix having at least one predetermined crosslinked matrix property.

For example, in an exemplary embodiment, the predetermined prepolymer blend property may be selected from a melt viscosity of the prepolymer blend (between about 1,000-20,000 cps); a molecular weight (between about 1,100 to about 2,100 g/mol); a maximum cure temperature (about 650° F.); suitable tack and/or drape for prepreg composites; processibility using RFI (with pressure at or below 200 psi and temperatures at or below about 650° F.); processibility using RTM (with pressures at or below 200 psi and temperatures at or below about 650° F.), and combinations thereof.

Further, in an exemplary embodiment, the predetermined crosslinked matrix property may be selected from a thermal oxidative stability (less than 4% weight loss when exposed to 555° F. and 50 psi for 1000 hours); a glass transition temperature (at least about 450° F. or at least about 525° F.) a void content (less than about 3%), room temperature tensile strength (at least about 100 ksi); room temperature compression strength (at least about 80 ksi); room temperature inplane shear (at least about 8 ksi), and combinations thereof.

In an exemplary embodiment, an article is formed from any of the exemplary tailorable polyimide prepolymer blends. The article may be a powder, a neat resin, a coating material, a film, an adhesive, a fiber, a composite, a laminate, a prepreg, a part, and combinations thereof.

Thus, embodiments disclosed herein provide processes suitable for forming polyimide composite articles. Exemplary processes include resin transfer molding (RTM) and resin infusion (RI). In an exemplary embodiment, the molar ratios of the various components may be varied to provide melt viscosities and molecular weights to provide RTM or RI processible prepolymer blends. In an exemplary process, a preform structure including reinforcing materials is tackified with a first prepolymer component of the polyimide resin system. A second prepolymer component of the polyimide resin system is forced into contact with the tackified preform. During the cure process, the first and second prepolymer components of the polyimide system mix and react to form the final crosslinked resin matrix.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tailorable polyimide resin system comprising:
   a first prepolymer component comprising a reaction product of an end group component, a dianhydride component, and a diamine component wherein the diamine component includes at least 4,4'-(1,3-phenylene-bis(1-methylethylidene)) bisaniline (Bis-M) and meta-phenylenediamine (mPDA); wherein the dianhydride component includes at least 3,4,3',4'-benzophenonetetracarboxylic dianhydride (BTDA); and the end group component includes at least 5-norbornene 2,3-dicarboxylic acid (NE); and
   a second prepolymer component different from the first prepolymer component, wherein the second prepolymer component comprises at least one of a monomeric mixture and a reaction product of an end group component, a dianhydride component, and a diamine component wherein the diamine component is at least one member of the group consisting of 4,4'-(1,3-phenylene-bis(1-methylethylidene)) bisaniline (Bis-M), 1,4-phenylenediamine (pPDA) and derivatives thereof; the dianhydride component is at least one member of the group consisting of 3,4,3',4'-benzophenonetetracarboxylic dianhydride (BTDA), 3,4,3',4'-biphenyltetracarboxylic dianhydride (BPDA) and derivatives thereof; and the end group component is at least one member of the group consisting of monomethyl ester of 5-norbornene 2,3-dicarboxylic acid (NE) and derivatives thereof;
   wherein the first and second prepolymer components are present in relative amounts to enable the resin system to be processed by resin transfer molding (RTM) and resin infusion (RI) methods.

2. The tailorable polyimide resin system according to claim 1 wherein following suitable RI or RTM processing, the resin system is able to provide a crosslinked polyimide matrix having a glass transition temperature of at least about 450° F. (232° C.).

3. The tailorable polyimide resin system according to claim 1 wherein following suitable RI or RTM processing, the resin system is able to provide a crosslinked polyimide matrix having a glass transition temperature of at least about 550° F. (288° C.).

4. The tailorable polyimide resin system according to claim 1 having a melt viscosity within a range of from about 800 cps to less than about 40,000 cps.

5. The tailorable polyimide resin system according to claim 1 having a melt viscosity within a range of from about 1,000 cps to about 20,000 cps.

6. The tailorable polyimide resin system according to claim 1 wherein the first prepolymer component is present in a powder form, and the second prepolymer component is present in a liquid form, and wherein the first prepolymer component comprises from about 20 wt % to about 30 wt % of the prepolymer blend.

7. The tailorable polyimide resin system according to claim 1 wherein the prepolymer blend comprises from about 10 to about 40 mole percent of the first prepolymer component and from about 60 to about 90 mole percent of the second prepolymer component.

* * * * *